United States Patent
Kim et al.

(10) Patent No.: US 9,137,145 B2
(45) Date of Patent: Sep. 15, 2015

(54) COMMUNICATION METHOD OF HUB AND TRANSMITTING, RECEIVING TERMINAL INCLUDED IN VIRTUAL GROUP

(75) Inventors: Jae Hoon Kim, Yongin-si (KR); Myeong Wuk Jang, Seoul (KR); Ji Hoon Lee, Anyang-si (KR); Sung Chan Choi, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 780 days.

(21) Appl. No.: 13/016,544

(22) Filed: Jan. 28, 2011

(65) Prior Publication Data

US 2011/0274039 A1 Nov. 10, 2011

(30) Foreign Application Priority Data

May 6, 2010 (KR) .......................... 10-2010-0042318

(51) Int. Cl.
*H04L 1/00* (2006.01)
*H04L 12/721* (2013.01)
(52) U.S. Cl.
CPC .................................... *H04L 45/124* (2013.01)
(58) Field of Classification Search
CPC ........................... H04W 52/0267; H04W 36/14
USPC ............................................................ 370/331
See application file for complete search history.

(56) References Cited

U.S. PATENT DOCUMENTS

| 2001/0030785 A1 | 10/2001 | Pangrac et al. |
| 2005/0085258 A1* | 4/2005 | Ishii et al. ................. 455/552.1 |
| 2006/0013177 A1* | 1/2006 | Saito ........................... 370/338 |
| 2008/0311855 A1* | 12/2008 | Manousakis et al. ...... 455/67.11 |
| 2011/0059752 A1* | 3/2011 | Garin et al. ................ 455/456.1 |
| 2011/0065424 A1* | 3/2011 | Estevez et al. ............. 455/414.3 |
| 2012/0184242 A1* | 7/2012 | Li et al. ........................ 455/406 |

FOREIGN PATENT DOCUMENTS

| JP | 2003-141118 | 5/2003 |
| KR | 10-2002-0059066 | 7/2002 |
| KR | 10-0679563 | 1/2007 |
| KR | 10-0681562 | 2/2007 |
| KR | 10-2008-0075277 | 8/2008 |

* cited by examiner

*Primary Examiner* — Shaq Taha
(74) *Attorney, Agent, or Firm* — NSIP Law

(57) ABSTRACT

Provided is a communication method of a hub that selects a transmission route from the hub to a receiving terminal of a receiving virtual group based on interface information about at least one interface which is available for use by the receiving terminal and is received from the receiving terminal and interface information about at least one interface which is available for use by a transmitting terminal of a transmitting virtual group and is received from the transmitting terminal.

17 Claims, 6 Drawing Sheets

COMMUNICATION METHOD OF HUB AND TRANSMITTING, RECEIVING TERMINAL INCLUDED IN VIRTUAL GROUP

CROSS-REFERENCE TO RELATED APPLICATION(S)

This application claims the benefit under 35 U.S.C. §119 (a) of Korean Patent Application No. 10-2010-0042318, filed on May 6, 2010, in the Korean Intellectual Property Office, the entire disclosure of which is incorporated herein by reference for all purposes.

BACKGROUND

1. Field

The following description relates to a communication method of a hub, a transmitting terminal, and a receiving terminal, and more particularly, to a communication method of a hub and a transmitting terminal and a receiving terminal included in virtual groups.

2. Description of Related Art

Contents may be shared smoothly and conveniently between devices of group members or other virtual groups when a content sharing service is provided between devices of group members configuring each virtual group.

SUMMARY

The following description relates to a method of selecting a transmission route from a transmitting terminal to a receiving terminal according to information indicating at least one interface available for use by the transmitting terminal and at least one interface available for use by the receiving terminal.

The foregoing and/or other features and aspects may be achieved by providing a communication method of a hub, the method including receiving, from at least one receiving terminal of a receiving virtual group, a data request message including interface information about at least one interface available for use by the at least one receiving terminal, receiving, from at least one transmitting terminal of a transmitting virtual group and including data corresponding to the data request message, a data transmission message including interface information about at least one interface available for use by the at least one transmitting terminal, selecting a transmission route from a hub of the transmitting virtual group to the at least one receiving terminal based on the interface information of the at least one receiving terminal and the interface information of the at least one transmitting terminal, and transmitting the data transmission message via the selected transmission route.

The method may further include collecting interface information from the at least one transmitting terminal of the transmitting virtual group.

The collecting may include collecting interface information of the at least one transmitting terminal in response to the at least one transmitting terminal being first registered in the transmitting virtual group.

Interface information of the at least one receiving terminal and/or the at least one transmitting terminal may include information about the transmission route and a reception route used by the respective terminals, a link capacity of at least one interface available for use by the respective terminals, a bandwidth of the respective terminals, an interface type available for use by the respective terminals, a physical characteristic, or any combination thereof.

The selecting may include selecting the transmission route based on a measurement result with respect to a Round Trip Time (RTT) transmission rate of the transmission route.

The method may further include deleting or changing information about a reception route from the at least one receiving terminal to the hub of the transmitting virtual group, the information being previously stored in the hub of the transmitting virtual group, in response to the data request message being received.

The hub of the transmitting virtual group may manage the interface information of the at least one receiving terminal and the interface information of the at least one transmitting terminal in an integrated manner. The hub of the transmitting virtual group may cause the data transmission message to be transmitted via a transmission route different from a route via which the data request message is transmitted.

The foregoing and/or other features and aspects may also be achieved by providing a communication method of a receiving terminal of a receiving virtual group, the method including transmitting a data request message including interface information about at least one interface available for use by the receiving terminal to request data of a transmitting terminal of a transmitting virtual group, receiving, from the transmitting virtual group, a data transmission message including interface information about the at least one interface available for use by the transmitting terminal, and updating a mapping table using the interface information of the receiving terminal and the interface information of the transmitting terminal, so that the mapping table indicates that the interface information of the receiving terminal and the interface information of the transmitting terminal are mapped to each other.

The method may further include receiving data corresponding to the data request message via a transmission route selected by a hub of the transmitting virtual group, and the hub may select one route from a plurality of routes as the transmission route based on the interface information of the receiving terminal and the interface information of the transmitting terminal.

The updating may include changing or deleting information stored in the mapping table based on the interface information of the receiving terminal and the interface information of the transmitting terminal.

Interface information of the receiving terminal and/or the transmitting terminal may include information about a transmission route and a reception route used by the respective terminals, a link capacity of at least one interface available for use by the respective terminals, a bandwidth of the respective terminals, an interface type available for use by the respective terminals, a physical characteristic, or any combination thereof.

The foregoing and/or other features and aspects may also be achieved by providing a communication method of a transmitting terminal of a transmitting virtual group, the method including receiving, from a hub of the transmitting virtual group, a data request message including interface information about at least one interface available for use by a receiving terminal of a receiving virtual group, transmitting a data transmission message including interface information about at least one interface available for use by the transmitting terminal to transmit data corresponding to the data request message, and updating a mapping table using the interface information of the receiving terminal and the interface information of the transmitting terminal, so that the mapping table indicates that the interface information of the receiving terminal and the interface information of the transmitting terminal are mapped to each other.

The transmitting may include transmitting the data transmission message to the receiving terminal via a transmission route selected by the hub, and the hub may determine one route from a plurality of routes as the selected route based on the interface information of the receiving terminal and the interface information of the transmitting terminal.

The foregoing and/or other features and aspects may also be achieved by providing a non-transitory computer-readable medium including a program for instructing a computer to perform the communication method of a hub, the method including receiving, from at least one receiving terminal of a receiving virtual group, a data request message including interface information about at least one interface available for use by the at least one receiving terminal, receiving, from at least one transmitting terminal of a transmitting virtual group and including data corresponding to the data request message, a data transmission message including interface information about at least one interface available for use by the at least one transmitting terminal, selecting a transmission route from a hub of the transmitting virtual group to the at least one receiving terminal based on the interface information of the at least one receiving terminal and the interface information of the at least one transmitting terminal, and transmitting the data transmission message via the selected transmission route.

The foregoing and/or other features and aspects may also be achieved by providing a communication method of a hub, the method including selecting a transmission route from a hub of a transmitting virtual group to a receiving terminal according to interface information of the receiving terminal and interface information of a transmitting terminal, and transmitting a data transmission message via the selected transmission route.

The interface information of the receiving terminal and the transmitting terminal may be previously stored in the hub of the transmitting virtual group.

The interface information of the receiving terminal may be transmitted to the hub of the transmitting virtual group along with a data request from the receiving terminal.

The interface information of the transmitting terminal may be transmitted to the hub of the transmitting virtual group in response to receiving a data request from the receiving terminal.

According to an aspect, a maximized efficiency of data transmission may be provided by setting an optimum route by two-way interface information when data are transmitted.

According to an aspect, a maximized efficiency of data transmission may be provided by separating a reception route of a data request message and a transmission route of a data transmission message from each other.

According to an aspect, a maximized efficiency of data transmission may be provided by supporting a plurality of routes for a transmission of a data request message and a data transmission message.

Other features and aspects will be apparent from the following detailed description, the drawings, and the claims.

BRIEF DESCRIPTION OF THE DRAWINGS

These and/or other aspects will become apparent and more readily appreciated from the following description of various example embodiments, taken in conjunction with the accompanying drawings briefly described below.

Figure 1:
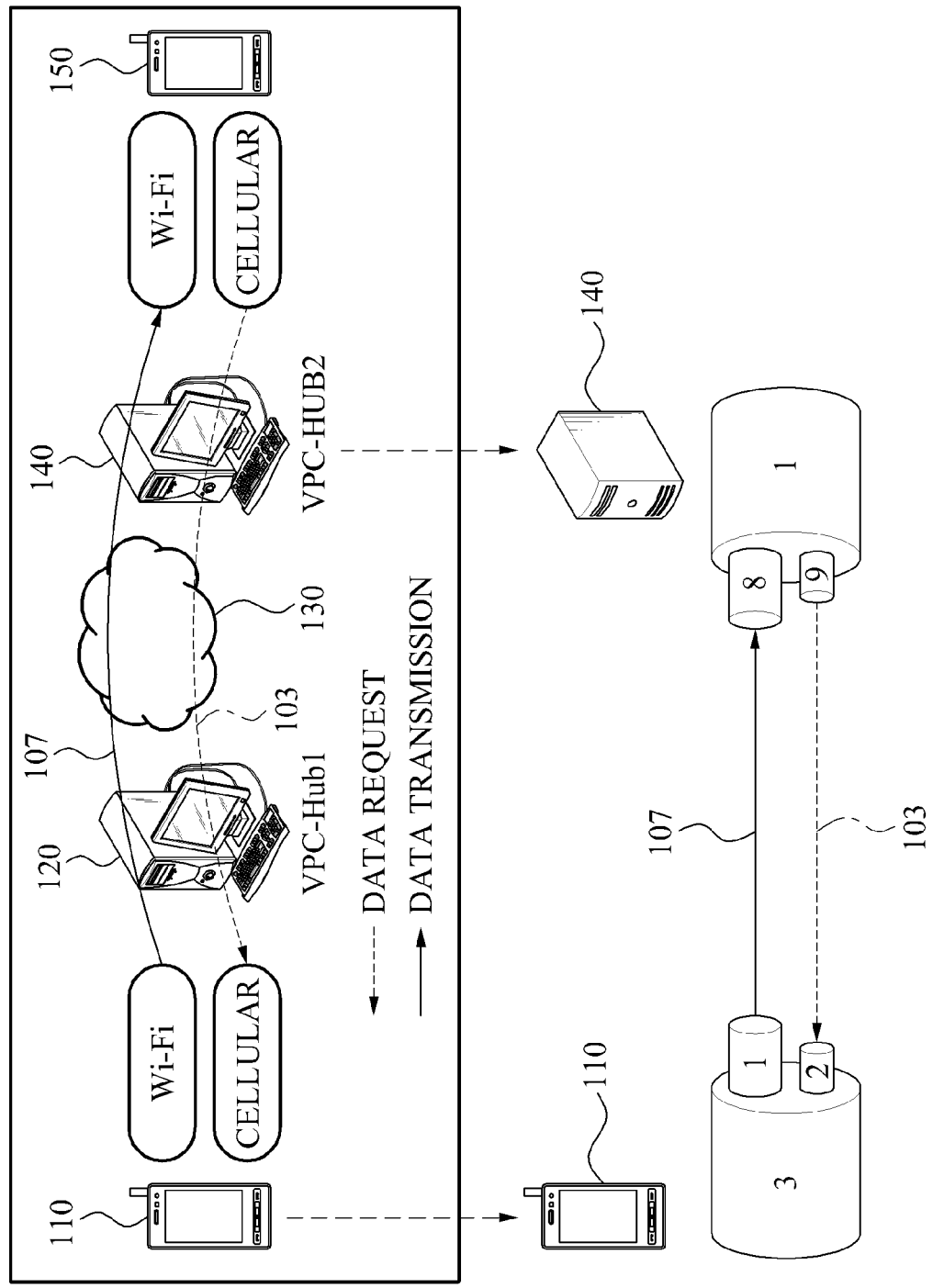
FIG. 1 is a diagram illustrating a network having a route for a data request message and a route for a data transmission message according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

FIG. 1 illustrates a network having a route for a data request message and a route for a data transmission message according to an example embodiment.

Although portions of the following description discuss such terms as transmitting terminals, receiving terminals, transmitting virtual groups, receiving virtual groups, and so on, it is understood that either of the terminals or virtual groups is capable of both transmitting and receiving data. The terms employed herein which designate one terminal and/or virtual to group as transmitting, and another terminal and/or virtual group as receiving, are merely used to simplify the description of example operations of these elements.

Referring to FIG. 1, the network may include a transmitting virtual group having a transmitting terminal 110 and a hub 120, and a receiving virtual group having a receiving terminal 150 and a hub 140. In this example, the transmitting virtual group and the receiving virtual group may be connected over the Internet 130. Each of the transmitting terminal 110 and the receiving terminal 150 may support at least two interfaces as wireless communication methods. For example, each of the transmitting terminal 110 and the receiving terminal 150 may support a wireless fidelity (Wi-Fi) interface and a cellular interface. It is understood that other wireless communication interfaces may be implemented along with or instead of either one or both of the Wi-Fi and cellular interfaces.

The receiving virtual group and the transmitting virtual group may correspond to a virtual group of an overlay concept. Therefore, an area of each of the receiving virtual group and the transmitting virtual group may be different from an area of a general Internet Protocol (IP) subnet. Each of the receiving virtual group and the transmitting virtual group may include a plurality of IP subnets.

Each of the transmitting terminal 110 and the receiving terminal 150 may request desired data, and may transmit and receive the desired data using at least one of a plurality of interfaces.

Hereinafter, a terminal including predetermined data may be referred to as the transmitting terminal 110, and a terminal of a data requestor that desires the predetermined data may be referred to as the receiving terminal 150.

An interface available for use by the transmitting terminal 110 and an interface available for use by the receiving terminal 150 may have different performances, and may support different bandwidths. As such, a delay may occur in a communication between the transmitting terminal 110 and the receiving terminal 150.

In a case in which the receiving terminal 150 desires predetermined data, the receiving terminal 150 may transmit the data request message to the hub 140. In such a case, the hub 140 may retransmit the data request message to the transmitting virtual group. The hub 120 may receive a data transmission message including the predetermined data from the transmitting terminal 110, and may retransmit the data transmission message to the receiving virtual group.

In a case in which a route via which the data request message is transmitted from the hub 140 to the transmitting virtual group and a route via which the data transmission message is transmitted from the hub 120 to the receiving virtual group needs to be the same, transmission may be inefficient. This may be due to the fact that in a case in which a plurality of messages are substantially transmitted and received via a single route, an efficiency of data transmission may decrease. Therefore, when it is possible to adaptively select at least one route from a plurality of routes, the efficiency of data transmission may be expected to increase.

The receiving terminal 150 may transmit, to the transmitting virtual group via the hub 140, the data request message including interface information about at least one interface available for use by the receiving terminal 150. The transmitting terminal 110 may transmit, to the receiving virtual group via the hub 120, a data transmission message including interface information about at least one interface available for use by the transmitting terminal 110 and data corresponding to the data request message.

In this example, the interface information of the transmitting terminal 110 may include information about a transmission route, a link capacity of at least one interface available for use by the transmitting terminal 110, information about an interface type and a physical characteristic, and information about a bandwidth of the transmitting terminal 110. Similarly, the interface information of the receiving terminal 150 may include information about a reception route, a link capacity of at least one interface available for use by the receiving terminal 150, information about an interface type and a physical characteristic, and information about a bandwidth of the receiving terminal 150.

The hub 140 may select an optimum route based on the interface information of the receiving terminal 150. For example, the hub 140 may determine whether to receive the data transmission message through a Wi-Fi type reception route or a cellular type reception route.

For example, it is assumed that the transmitting terminal 110, which includes data and belongs to the transmitting virtual group, receives a request for the data from the receiving terminal 150 belonging to the receiving virtual group. In this case, the transmitting terminal 110 may transmit the data transmission message using a transmission route 107 which is different from a reception route 103 via which the data request message is received from the receiving terminal 150.

The transmitting terminal 110 and the hub 120 of the transmitting virtual group may integrally manage the reception route 103 via which the data request message is received from the receiving terminal 150, and the transmission route 107 via which the data transmission message is transmitted. The above scheme as described may be applicable to the hub 140 of the receiving virtual group.

For example, as illustrated in FIG. 1, in response to the data request message from the hub 140 of the receiving virtual group being received via a number 9 interface to a number 2 interface of the transmitting terminal 110 of the transmitting virtual group, the transmitting terminal 110 may transmit the data transmission message using a number 1 interface instead of using the number 2 interface which was used for the reception. Also, the data transmission message may be transmitted to the hub 140 of the receiving virtual group via a number 8 interface instead of the number 9 interface which was used to send the data request message from the hub 140 to the transmitting terminal 110.

In this example, the hub 120 of the transmitting virtual group and the hub 140 of the receiving virtual group may determine an interface based on the aforementioned interface information of each terminal. Accordingly, an optimum or adaptive route selection may be performed.

Figure 2:
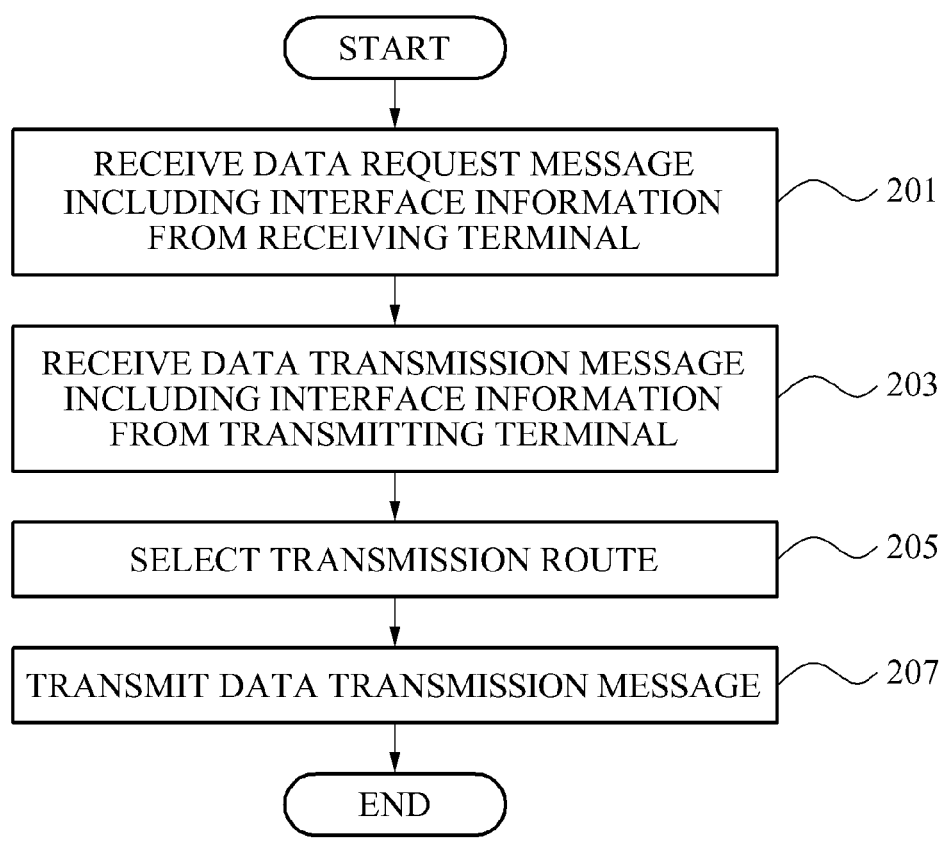
FIG. 2 is a flowchart illustrating a communication method of a hub according to an example embodiment.

FIG. 2 illustrates a communication method of a hub according to an example embodiment.

Referring to FIG. 2, the communication method of the hub may include receiving, from a receiving terminal, a data request message including interface information in operation 201, receiving, from a transmitting terminal, a data transmission message including interface information in operation 203, selecting a transmission route in operation 205, and transmitting the data transmission message in operation 207.

In operation 201, a hub of a transmitting virtual group may receive the data request message from the receiving terminal belonging to a receiving virtual group. In this example, the data request message may include interface information about at least one interface which is available for use by the receiving terminal.

The receiving terminal may include, in the data request message, the interface information about the at least one interface which is available for use by the receiving terminal, and may thereby transmit the data request message. Therefore, when a hub of the receiving virtual group transmits the data request message to the hub of the transmitting virtual group and the transmitting terminal, the hub of the receiving virtual group may select a reception route based on the interface information of the receiving terminal.

The hub of the receiving virtual group may select an optimum interface or route from a plurality of interfaces or routes which are available for use by the receiving terminal, based on the interface information of the receiving terminal.

In operation 203, the hub of the transmitting virtual group may receive the data transmission message from the transmitting terminal including data corresponding to the data request message and belonging to the transmitting virtual group. In this example, the data transmission message may include interface information about at least one interface which is available for use by the transmitting terminal.

According to various example embodiments, prior to operation 201, the hub of the receiving virtual group may collect interface information of at least one receiving terminal belonging to the receiving virtual group from the at least one receiving terminal.

Similarly, prior to operation 203, the hub of the transmitting virtual group may collect interface information of at least one transmitting terminal belonging to the transmitting virtual group from the at least one transmitting terminal. In other words, the interface information of the at least one transmitting terminal may be collected by the hub of the transmitting virtual group, and/or the interface information of the at least one receiving terminal may be collected by the hub of the receiving virtual group, before the data request message is sent from the at least one receiving terminal to the at least one transmitting terminal.

The hub of the transmitting virtual group and the hub of the receiving virtual group may use the collected interface information to manage members of each virtual group. In this example, the members may refer to terminals belonging to each virtual group.

The hub of the transmitting virtual group or the hub of the receiving virtual group may use the interface information of each terminal to select an optimum route or an adaptive route.

For example, the hub of the transmitting virtual group may collect the interface information of the transmitting terminal, and manage the collected interface information. The interface information may be collected in response to at least one transmitting terminal belonging to the transmitting virtual group being first registered in the transmitting virtual group.

In operation 205, the hub of the transmitting virtual group may select a transmission route from the hub of the transmitting virtual group to the receiving terminal, based on the interface information of the receiving terminal and the interface information of the transmitting terminal. The hub of the transmitting virtual group may select, as a transmission route, one of various types of interfaces which may be adaptively selected by each terminal, based on the interface information of the receiving terminal and the interface information of the transmitting terminal.

For example, in a case in which a type of an interface used by the transmitting terminal, belonging to the transmitting virtual group and including data corresponding to a data request message, corresponds to a WiFi communication, the hub of the transmitting virtual group may transmit the data transmission message via a transmission route having a relatively wide bandwidth, based on a bandwidth of the WiFi communication.

Accordingly, an efficiency of data transmission based on the interface type may be improved.

Similarly, in a case in which a type of interface used by the transmitting terminal corresponds to a cellular communication, the hub of the transmitting virtual group may transmit the data transmission message via a route with a relatively narrow bandwidth which is different from the route of the WiFi communication, based on a bandwidth of the cellular communication.

The hub of the transmitting virtual group may improve an efficiency of data transmission in various communication environments by selecting a transmission route based on the interface information of each terminal.

In operation 205, in which the hub of the transmitting virtual group selects the transmission route, the hub may select the transmission route based on a measurement result with respect to a Round Trip Time (RTT) transmission rate of the transmission route.

Depending on various example embodiments in which the hub of the transmitting virtual group selects the transmission route, the hub may select the transmission route based on a history of a previous transmission rate of each route. Also, the hub of the transmitting virtual group may select the transmission route by combining the measurement result with respect to an RTT transmission rate and the history of the previous transmission rate. Here, the history of the previous transmission rate of each route may be stored in the hub of the transmitting virtual group, the transmitting terminal, and/or the like.

In operation 207, the hub of the transmitting virtual group may transmit the data transmission message via the selected transmission route.

The hub of the transmitting virtual group may integrally manage the interface information of the receiving terminal and the interface information of the transmitting terminal. The hub of the transmitting virtual group may enable the data transmission message to be transmitted via a transmission route which is different from a route via which the data request message is transmitted.

In a network having various communication environments, in a case in which it is possible to transmit data more quickly and more efficiently using another route rather than using the reception route via which the receiving terminal has transmitted the data request message, the other route may be used instead of the reception route.

In response to the data transmission message being transmitted in operation 207, the hub of the transmitting virtual group may delete or change information about the reception route from the receiving terminal to the hub of the transmitting virtual group. In such a case, the information may have been stored in the hub of the transmitting virtual group prior to or upon the data request message being received.

The hub of the receiving virtual group transmitting the data request message to the transmitting terminal may maximize an efficiency of data transmission by separating the reception route via which the data request message is transmitted, and the transmission route via which the data transmission message is transmitted.

In a case in which the reception route of the data request message and the transmission route of the data transmission message are different from each other in various communication environments, the hub of the receiving virtual group may prevent errors from occurring in a data transmission.

For example, in a case in which a transmission type such as an interest type is used, the hub of the transmitting virtual group may store information about the reception route used for receiving the data request message because data are to be transmitted via a route used for receiving the data.

Therefore, in this case, the hub of the receiving virtual group may enable a hub or reception interface to perform a transmission via an optimum route by deleting or changing information about the reception route from the receiving terminal to the hub of the transmitting virtual group. The information may be stored in the hub of the transmitting virtual group in response to the data request message being received.

Figure 3:
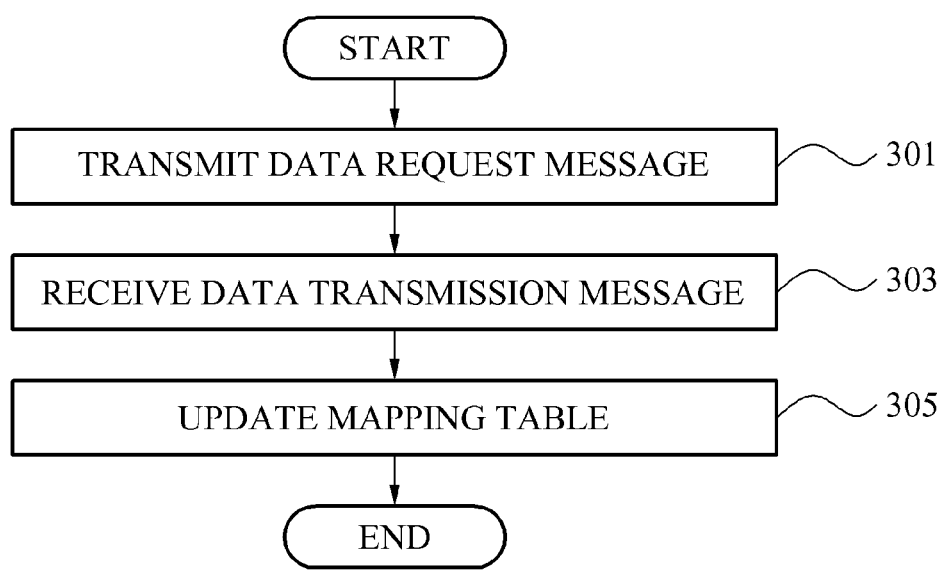
FIG. 3 is a flowchart illustrating a communication method of a receiving terminal belonging to a receiving virtual group according to an example embodiment.

FIG. 3 illustrates a communication method of a receiving terminal belonging to a receiving virtual group according to an example embodiment.

Referring to FIG. 3, the communication method of the receiving terminal belonging to a receiving virtual group may include transmitting a data request message in operation 301, receiving a data transmission message in operation 303, and updating a mapping table in operation 305.

In operation 301, the receiving terminal may transmit the data request message including interface information about at least one interface which is available for use by the receiving terminal to request data included in a transmitting terminal belonging to a transmitting virtual group.

In operation 303, the receiving terminal may receive, from the transmitting virtual group, the data transmission message including the interface information about the at least one interface which is available for use by the transmitting terminal.

The receiving terminal may receive data corresponding to the data transmission message via a transmission route selected by a hub of the transmitting virtual group. In this case, the hub of the transmitting virtual group may determine one of a plurality of routes as the selected transmission route based on the interface information of the receiving terminal and the interface information of the transmitting terminal.

In operation 305, the receiving terminal may update the mapping table using the interface information of the receiving terminal and the interface information of the transmitting terminal to indicate that the interface information of the receiving terminal and the interface information of the transmitting terminal are mapped to each other.

The receiving terminal may manage the mapping table to integrally manage a reception route via which the data request message is transmitted and the transmission route via which the data transmission message is received.

The receiving terminal may manage information about the transmission and the reception in both the interface via which the data request message is transmitted, and the interface via which the data transmission message is received.

In a case in which the transmitting terminal of the transmitting virtual group which received the data request message manages the reception condition of the message using a mapping table, the transmitting terminal may modify information about the reception route from the receiving terminal to the hub of the transmitting virtual group in a point of time of transmitting data by using a route that is different from the reception route as the transmission route.

In operation 305, the receiving terminal may update the mapping table by changing or deleting information stored in the mapping table, based on the interface information of the receiving terminal and the interface information of the transmitting terminal.

In this case, the interface information of one of the receiving terminal and the transmitting terminal may include information about the transmission route and the reception route the terminal uses, a link capacity of at least one interface available for use by the terminal, a bandwidth of the terminal, an interface type available for use by the terminal, and a physical characteristic.

Figure 4:
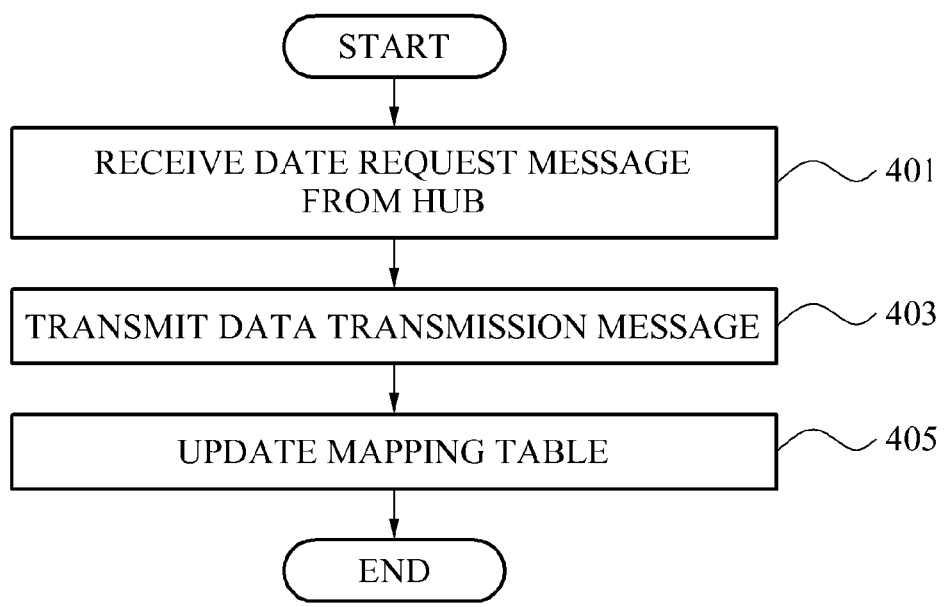
FIG. 4 is a flowchart illustrating a communication method of a transmitting terminal belonging to a transmitting virtual group according to an example embodiment.

FIG. 4 illustrates a communication method of a transmitting terminal belonging to a transmitting virtual group according to an example embodiment.

Referring to FIG. 4, the communication method of the transmitting terminal belonging to a transmitting virtual group may include receiving a date request message from a hub in operation 401, transmitting a data transmission message in operation 403, and updating a mapping table in operation 405.

In operation 401, the transmitting terminal may receive, from a hub of the transmitting virtual group, the date request message including interface information about at least one interface which is available for use by a receiving terminal belonging to a receiving virtual group.

In operation 403, the transmitting terminal may transmit, to the hub of the transmitting virtual group, the data transmission message including interface information about at least one interface which is available for use by the transmitting terminal to transmit data corresponding to the data request message. The transmitting terminal may transmit the data transmission message to the receiving terminal via a transmission route selected by the hub of the transmitting virtual group.

In this case, the hub of the transmitting virtual group may determine one of a plurality of routes as the selected transmission route based on the interface information of the receiving terminal and the interface information of the transmitting terminal.

In operation 405, the transmitting terminal may update the mapping table using the interface information of the receiving terminal and the interface information of the transmitting terminal to indicate that the interface information of the receiving terminal and the interface information of the transmitting terminal are mapped to each other.

Operations included in the communication method of the receiving terminal belonging to the receiving virtual group referring to FIG. 3 may be similar to the communication method of the transmitting terminal belonging to the transmitting virtual group.

Figure 5:
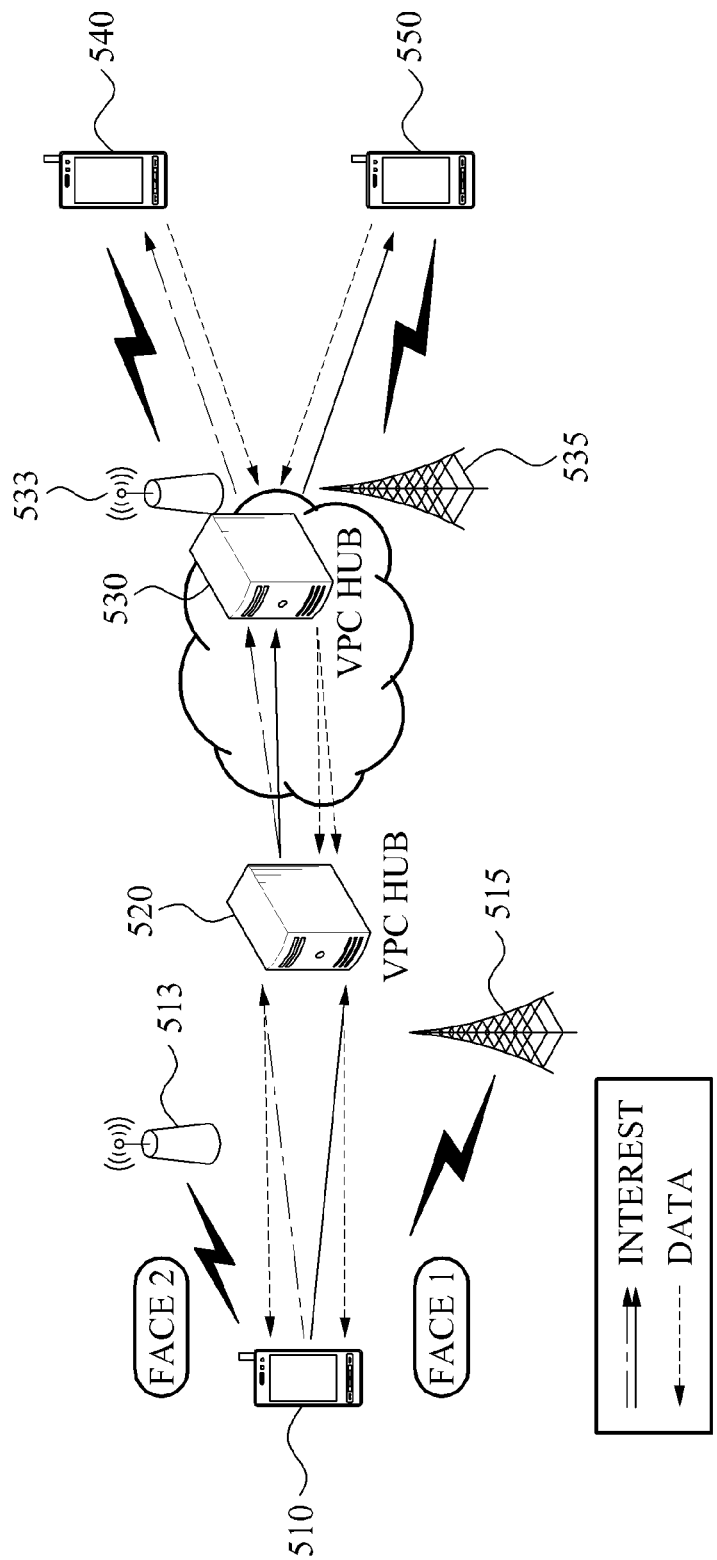
FIG. 5 is a diagram illustrating a network in which a data request message and a data transmission message are received and transmitted using an optimum reception route and an optimum transmission route according to an example embodiment.

FIG. 5 illustrates a network in which a data request message and a data transmission message are received and transmitted using an optimum reception route and an optimum transmission route according to an example embodiment.

Referring to FIG. 5, in this example it is assumed that a first receiving terminal 540 may use a WiFi communication 533 and a second receiving terminal 550 may use a cellular communication 535. Here, the first receiving terminal 540 and the second receiving terminal 550 belong to a receiving virtual group and may request data. In this example, a transmitting terminal 510 uses at least one of a WiFi communication 513 and a cellular communication 515. The transmitting terminal 510 belongs to a transmitting virtual group and may include the data that may be requested by the first receiving terminal 540 and/or the second receiving terminal 550.

In this case, the first receiving terminal 540 and the second receiving terminal 550 belonging to the receiving virtual group may transmit a data request message to a hub 530 of the receiving virtual group. The data request message may include interface information about at least one interface available for use by each receiving terminal.

Upon receiving the data request message, the hub 530 of the receiving virtual group may select a reception route based on the interface information of each receiving terminal, and may transmit the data request message to a hub 520 and the transmitting terminal 510 of the transmitting virtual group.

Accordingly, the hub 520 of the transmitting virtual group may receive, from the first receiving terminal 540 and the second receiving terminal 550, the data request message including the interface information about each terminal.

The transmitting terminal 510 including the data requested by the receiving terminals may transmit a data transmission message to the hub 520 of the transmitting virtual group. The data transmission message may include interface information about at least one interface available for use by the transmitting terminal 510.

The hub 520 of the transmitting virtual group may select a transmission route, and may transmit the data transmission message via the selected transmission route.

The hub 520 of the transmitting virtual group may select the transmission route from the hub 520 of the transmitting virtual group to the first receiving terminal 540 and to the second receiving terminal 550 based on the interface information of the receiving terminals 540 and 550 and the interface information of the transmitting terminal 510.

Therefore, the hub 520 of the transmitting virtual group may transmit the data transmission message based on the interface information of each receiving terminal. For example, in a case in which the second receiving terminal 550 uses the cellular communication as an interface type, the hub 520 may select a route 533 of which an interface type is the cellular communication based on a relatively low bandwidth of the cellular communication, and may transmit the data transmission message to the first receiving terminal 540 via the selected route 533.

Similarly, in a case in which the first receiving terminal 540 uses the WiFi communication as an interface type, the hub 520 may select a route 535 of which an interface type is the WiFi communication based on a relatively high bandwidth of the WiFi communication, and may transmit the data transmission message to the second receiving terminal 550 via the selected route 535.

Figure 6:
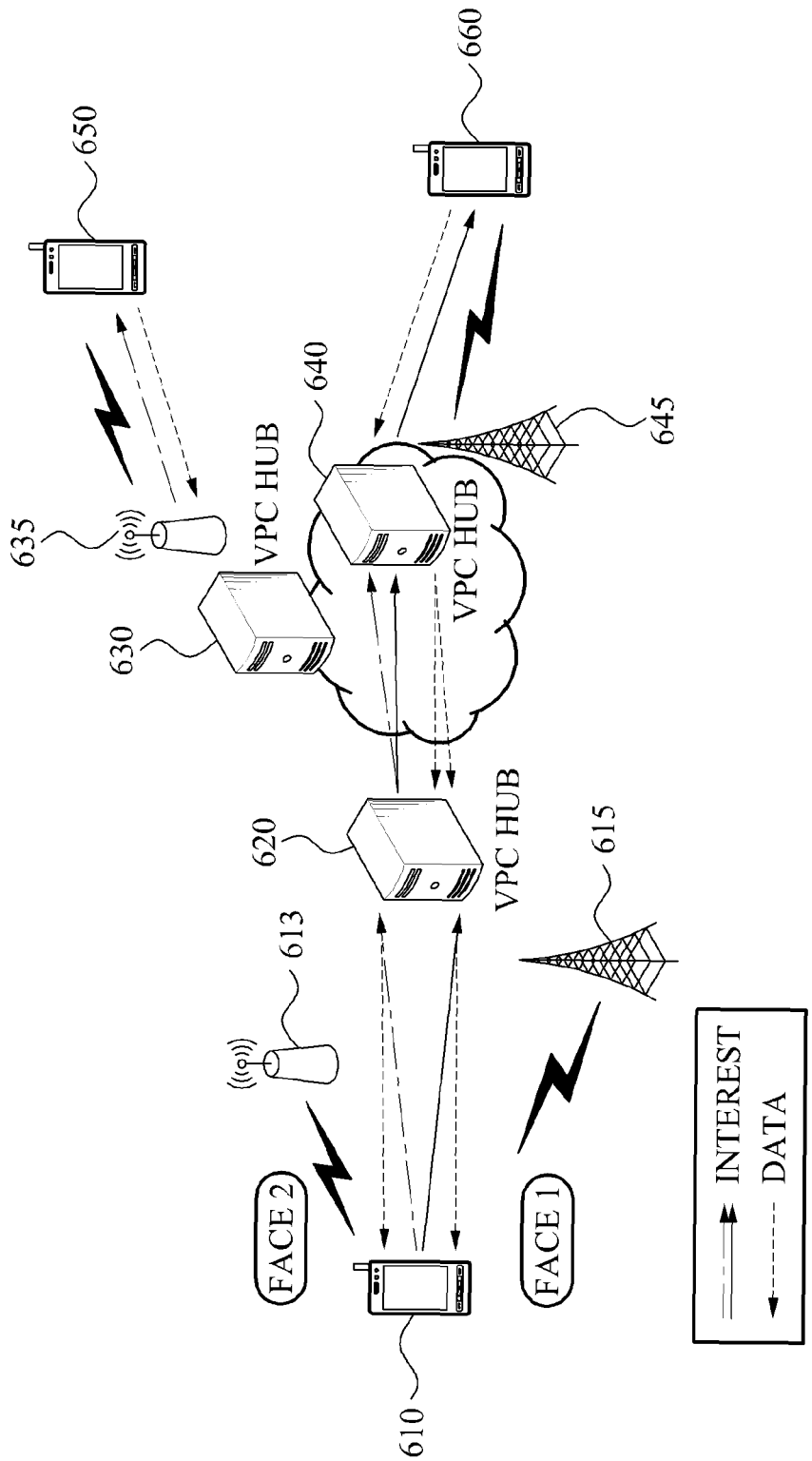
FIG. 6 is a diagram illustrating a network in which a data request message and a data transmission message are received and transmitted using an optimum reception route and an optimum transmission route according to another example embodiment.

FIG. 6 illustrates a network in which a data request message and a data transmission message are received and transmitted using an optimum reception route and an optimum transmission route according to another example embodiment.

Referring to FIG. 6, a hub may support the best use of routes available for a data request message received from a terminal of a data requestor, thereby increasing an efficiency of data transmission.

For example, it is assumed that a first receiving terminal 650 belonging to a first receiving virtual group may use a WiFi communication 635, and a second receiving terminal 660 belonging to a second receiving virtual group may use a cellular communication 645. It is assumed that a transmission terminal 610 belonging to a transmitting virtual group and including data corresponding to a data request from the receiving terminals uses at least one of a WiFi communication 613 and a cellular communication 615.

In this case, the first receiving terminal 650 belonging to the first receiving virtual group may transmit, to a hub 630 of the first receiving virtual group, a data request message including interface information about at least one interface which is available for use by the first receiving terminal 650.

The second receiving terminal 660 belonging to the second receiving virtual group may transmit, to a hub 640 of the second receiving virtual group, a data request message including interface information about at least one interface which is available for use by the second receiving terminal 660.

The hub 630 of the first receiving virtual group and the hub 640 of the second receiving virtual group may select a reception route based on interface information of each terminal to transmit the data request message to a hub 620 and the transmitting terminal 610 of the transmitting virtual group.

Accordingly, the hub 620 of the transmitting virtual group may receive, from the first receiving terminal 650 and the second receiving terminal 660, the data request message including interface information corresponding to each terminal.

The transmitting terminal 610 including data corresponding to the data request messages may transmit, to the hub 620 of the transmission virtual group, the data transmission message including interface information about at least one interface which is available for use by the transmitting terminal 610.

The hub 620 of the transmitting virtual group may select a transmission route from the hub 620 of the transmitting virtual group to the first receiving terminal 650 and the second receiving terminal 660, and may transmit the data transmission message via the selected route.

The hub 620 of the transmitting virtual group may select the transmission route from the hub 620 of the transmitting virtual group to the first receiving terminal 650 and to the second receiving terminal 660 based on interface information of the first receiving terminal 650 and the second receiving terminal 660 and interface information of the transmitting terminal 610.

In the case of the second receiving terminal 660 which uses the cellular communication as an interface type, the hub 620 of the transmitting virtual group may select a route of which an interface type is a cellular communication from various interfaces connected with the hub 620 of the transmitting virtual group based on a relatively low bandwidth of the cellular communication, and may transmit the data transmission message to the first receiving terminal 650 via the selected route.

In the case of the first receiving terminal 650 which uses the WiFi communication as an interface type, the hub 620 of the transmitting virtual group may select a route of which an interface type is a WiFi communication from various interfaces connected with the hub 620 of the transmitting virtual group based on a relatively high bandwidth of the WiFi communication, and may transmit the data transmission message to the second receiving terminal 660 via the selected route.

Interface information of the first receiving terminal 650 and the second receiving terminal 660 and interface information of the transmitting terminal 610 may include information about the transmission route and the reception route each terminal uses, a link capacity of at least one interface available for use by each terminal, a bandwidth of each terminal, an interface type available for use by each terminal, a physical characteristic, and so on.

Therefore, the hub 620 of the transmitting virtual group, the hub 630 of the first receiving virtual group, and the hub 640 of the second receiving virtual group may select the transmission route and the reception route based on the aforementioned interface type and on various characteristics included in the interface information.

The processes, functions, methods and/or software described above including a communication method of a hub may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a hub, the method comprising:
receiving, from at least one receiving terminal of a receiving virtual group, a data request message comprising interface information about at least one interface available for use by the at least one receiving terminal;
receiving, from at least one transmitting terminal of a transmitting virtual group, a data transmission message comprising interface information about at least one interface available for use by the at least one transmitting terminal and comprising data corresponding to the data message;
selecting a transmission route from a hub of the transmitting virtual group to the at least one receiving terminal based on the interface information of the at least one receiving terminal and the interface information of the at least one transmitting terminal; and
transmitting the data transmission message via the selected transmission route,
wherein the interface information of the at least one transmitting terminal being first registered in the transmitting virtual group,
wherein interface information of both the at least one receiving terminal and the at least one transmitting terminal comprises information about the transmission route and a reception route used by the respective terminals, a link capacity of at least one interface available for use by the respective terminals, a bandwidth of the respective terminals, and an interface type available for use by the respective terminals.

2. The method of claim 1, further comprising:
collecting interface information from the at least one transmitting terminal of the transmitting virtual group.

3. The method of claim 1, wherein the selecting includes selecting the transmission route based on a measurement result with respect to a Round Trip Time (RTT) transmission rate of the transmission route.

4. The method of claim 1, further comprising:
deleting or changing information about a reception route from the at least one receiving terminal to the hub of the transmitting virtual group, the information being previously stored in the hub of the transmitting virtual group, in response to the data request message being received.

5. A communication method of a receiving terminal of a receiving virtual group, the method comprising:
transmitting a data request message including interface information about at least one interface available for use by the receiving terminal to request data of a transmitting terminal of a transmitting virtual group;
receiving, from the transmitting virtual group, a data transmission message including interface information about the at least one interface available for use by the transmitting terminal; and
updating a mapping table using the interface information of the receiving terminal and the interface information of the transmitting terminal, so that the mapping table indicates that the interface information of the receiving terminal and the interface information of the transmitting terminal are mapped to each other,
wherein the interface information of the at least one transmitting terminal being first registered in the transmitting virtual group,
wherein interface information of both the receiving terminal and the transmitting terminal comprises information about the transmission route and a reception route used by the respective terminals, a link capacity of at least one interface available for use by the respective terminals, a bandwidth of the respective terminals, and an interface type available for use by the respective terminals.

6. The method of claim 5, further comprising:
receiving data corresponding to the data request message via a transmission route selected by a hub of the transmitting virtual group,
wherein the hub selects one route from a plurality of routes as the transmission route based on the interface information of the receiving terminal and the interface information of the transmitting terminal.

7. The method of claim 5, wherein the updating comprises changing or deleting information stored in the mapping table based on the interface information of the receiving terminal and the interface information of the transmitting terminal.

8. A communication method of a transmitting terminal of a transmitting virtual group, the method comprising:
receiving, from a hub of the transmitting virtual group, a data request message including interface information about at least one interface available for use by a receiving terminal of a receiving virtual group;
transmitting a data transmission message including interface information about at least one interface available for use by the transmitting terminal to transmit data corresponding to the data request message; and
updating a mapping table using the interface information of the receiving terminal and the interface information of the transmitting terminal, so that the mapping table indicates that the interface information of the receiving terminal and the interface information of the transmitting terminal are mapped to each other,
wherein the interface information of the at least one transmitting terminal being first registered in the transmitting virtual group,
wherein interface information of both the receiving terminal and the transmitting terminal comprises information about the transmission route and a reception route used by the respective terminals, a link capacity of at least one interface available for use by the respective terminals, a bandwidth of the respective terminals, and an interface type available for use by the respective terminals.

9. The method of claim 8, wherein:
the transmitting includes transmitting the data transmission message to the receiving terminal via a transmission route selected by the hub, and
the hub determines one route from a plurality of routes as the selected route based on the interface information of the receiving terminal and the interface information of the transmitting terminal.

10. A non-transitory computer-readable medium comprising a program for instructing a computer to perform the method of claim 1.

11. A communication method of a hub, the method comprising:
selecting a transmission route from a hub of a transmitting virtual group to a receiving terminal according to interface information of the receiving terminal and interface information of a transmitting terminal; and
transmitting a data transmission message via the selected transmission route,
wherein the interface information of the at least one transmitting terminal being first registered in the transmitting virtual group,
wherein interface information of both the receiving terminal and the transmitting terminal comprises information about the transmission route and a reception route used by the respective terminals, a link capacity of at least one interface available for use by the respective terminals, a bandwidth of the respective terminals, and an interface type available for use by the respective terminals.

12. The method of claim 11, wherein the interface information of the receiving terminal and the transmitting terminal are previously stored in the hub of the transmitting virtual group.

13. The method of claim 11, wherein the interface information of the receiving terminal is transmitted to the hub of the transmitting virtual group along with a data request from the receiving terminal.

14. The method of claim 11, wherein the interface information of the transmitting terminal is transmitted to the hub of the transmitting virtual group in response to receiving a data request from the receiving terminal.

15. The method of claim 1, wherein:
the receiving comprises receiving the data request message from the receiving terminal via a reception route from the receiving terminal to the hub; and
the selecting comprises selecting the transmission route to be different than the reception route based on the interface information of the receiving terminal and the interface information of the transmitting terminal.

16. The method of claim 15, wherein:
the reception route comprises first interfaces of the receiving terminal and the hub, respectively;
the selected transmission route comprises second interfaces of the hub and the receiving terminal, respectively; and
the first interfaces and the second interfaces are different than each other.

17. The method of claim 5, wherein:
the transmitting comprises transmitting the data request message to the transmitting terminal via a reception route from the receiving terminal to the transmitting terminal;
the receiving comprises receiving the data transmission message from the transmitting terminal via a transmission route from the transmitting terminal to the receiving terminal; and
the updated mapping table indicates the reception route and the transmission route that are mapped to each other.

\* \* \* \* \*